US012700382B2

(12) United States Patent
Umehara et al.

(10) Patent No.: US 12,700,382 B2
(45) Date of Patent: Aug. 4, 2026

(54) DISPLAY DEVICE AND CONTROL METHOD FOR SUPPRESSING DETERIORATION IN IMAGE QUALITY AND REDUCING POWER CONSUMPTION

(71) Applicant: Sharp Display Technology Corporation, Kameyama City (JP)

(72) Inventors: Tetsuya Umehara, Kameyama City (JP); Masahiro Takeda, Kameyama City (JP); Hideo Hosorogi, Kameyama City (JP)

(73) Assignee: Sharp Display Technology Corporation, Mie (JP)

( * ) Notice: Subject to any disclaimer, the term of this patent is extended or adjusted under 35 U.S.C. 154(b) by 0 days.

(21) Appl. No.: 18/894,353

(22) Filed: Sep. 24, 2024

(65) Prior Publication Data

US 2025/0104665 A1 Mar. 27, 2025

(30) Foreign Application Priority Data

Sep. 25, 2023 (JP) ................................ 2023-161765

(51) Int. Cl.
*G09G 3/30* (2006.01)
*G09G 3/36* (2006.01)

(52) U.S. Cl.
CPC ....... *G09G 3/3677* (2013.01); *G09G 2310/08* (2013.01); *G09G 2340/0435* (2013.01)

(58) Field of Classification Search
CPC ............... G09G 3/3648; G09G 3/3677; G09G 2310/08; G09G 2340/0435
See application file for complete search history.

(56) References Cited

U.S. PATENT DOCUMENTS

| | | | | |
|---|---|---|---|---|
| 10,923,012 | B1 * | 2/2021 | Hu | G09G 3/3677 |
| 2002/0075249 | A1 | 6/2002 | Kubota et al. | |
| 2012/0105496 | A1 * | 5/2012 | Komiya | G09G 3/003 345/77 |
| 2015/0371598 | A1 * | 12/2015 | So | G09G 3/20 345/212 |
| 2016/0111055 | A1 | 4/2016 | Na et al. | |
| 2016/0351154 | A1 * | 12/2016 | Xu | G11C 19/287 |

FOREIGN PATENT DOCUMENTS

| | | | |
|---|---|---|---|
| JP | 2004-151222 | A | 5/2004 |
| JP | 2006-251820 | A | 9/2006 |
| JP | 2012-078127 | A | 4/2012 |
| JP | 2016-081066 | A | 5/2016 |
| WO | 2018/178792 | A1 | 10/2018 |

* cited by examiner

*Primary Examiner* — Sanghyuk Park
(74) *Attorney, Agent, or Firm* — ScienBiziP, P.C.

(57) ABSTRACT

A display device includes multiple scan lines arranged in a display region; a first scan line driving circuit outside the display region that is connected to multiple scan lines at one end in an extending direction and supplies voltages to multiple scan lines; a second scan line driving circuit outside the display region that is connected to multiple scan lines at the other end in the extending direction and supplies voltages to multiple scan lines; and a control circuit. The control circuit alternately drives either the first scan line driving circuit or the second scan line driving circuit for each predetermined frame when a refresh rate of an image displayed according to a video signal is a first refresh rate, and drives both the first scan line driving circuit and the second scan line driving circuit at a second refresh rate higher than the first refresh rate.

5 Claims, 8 Drawing Sheets

DISPLAY DEVICE AND CONTROL METHOD FOR SUPPRESSING DETERIORATION IN IMAGE QUALITY AND REDUCING POWER CONSUMPTION

BACKGROUND

1. Field

The present disclosure relates to a display device and a control method.

2. Description of the Related Art

As a frame of a liquid crystal display panel becomes narrower, a scan line driving circuit may be reduced in size. Therefore, a power of the scan line driving circuit tends to be reduced. On the other hand, display may be driven at a high refresh rate for use in moving images, games, or the like. When the power of the scan line driving circuit is reduced due to the reduction in size, an image quality may deteriorate at a high refresh rate. Japanese Unexamined Patent Application Publication No. 2012-78127 discloses a substrate provided with two gate driving circuits in one TFT array region.

It is desirable to suppress deterioration in image quality at the time of display at a high refresh rate and to reduce power consumption at the time of display at a low refresh rate.

SUMMARY

According to an embodiment, a display device includes a plurality of scan lines arranged side by side in a display region; a first scan line driving circuit that is disposed outside the display region, is connected to the plurality of scan lines at one end in an extending direction of the plurality of scan lines, and supplies a voltage to the plurality of scan lines; a second scan line driving circuit that is disposed outside the display region, is connected to the plurality of scan lines at another end in the extending direction of the plurality of scan lines, and supplies a voltage to the plurality of scan lines; and a control circuit. The control circuit is configured to alternately drive either the first scan line driving circuit or the second scan line driving circuit for each predetermined frame when a refresh rate of an image displayed according to a video signal is a first refresh rate, and drive both the first scan line driving circuit and the second scan line driving circuit at a second refresh rate higher than the first refresh rate.

Further details are described in the embodiments below.

DESCRIPTION OF THE EMBODIMENTS

Figure 1:
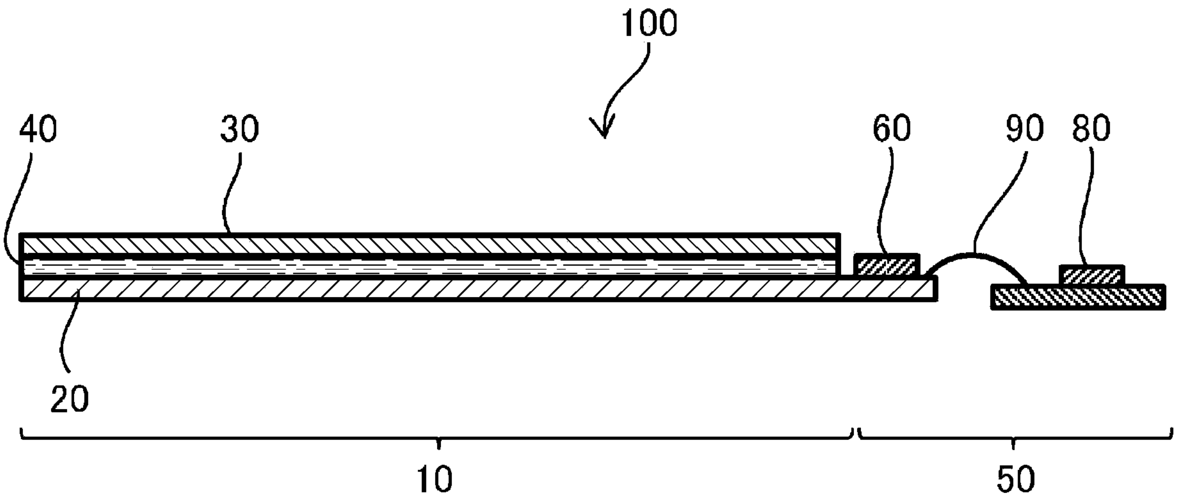
FIG. 1 is a schematic cross-sectional view illustrating an example of a configuration of a display device according to an embodiment.

1. Overview of Display Device and Control Method (1) A display device according to an embodiment includes a plurality of scan lines arranged side by side in a display region; a first scan line driving circuit that is disposed outside the display region, is connected to the plurality of scan lines at one end in an extending direction of the plurality of scan lines, and supplies a voltage to the plurality of scan lines; a second scan line driving circuit that is disposed outside the display region, is connected to the plurality of scan lines at the other end in the extending direction of the plurality of scan lines, and supplies a voltage to the plurality of scan lines; and a control circuit. The control circuit is configured to alternately drive either the first scan line driving circuit or the second scan line driving circuit for each predetermined frame when a refresh rate of an image displayed according to a video signal is a first refresh rate, and drive both the first scan line driving circuit and the second scan line driving circuit at a second refresh rate higher than the first refresh rate.

In the display device according to the embodiment, the control circuit drives both the first scan line driving circuit and the second scan line driving circuit in the second refresh rate, so that voltages are supplied to the plurality of scan lines from both the first scan line driving circuit and the second scan line driving circuit from both ends of one end and the other end of the scan lines. In this way, voltages can be sufficiently supplied to the entire scan lines, resulting in displaying an image with a high display quality.

Since the control circuit alternately drives either the first scan line driving circuit or the second scan line driving circuit for each predetermined frame in the first refresh rate, half of the scan line driving circuits at the second refresh rate stop driving at the first refresh rate. Thus, according to the control method, both the image quality at the high refresh rate and a low power consumption are realized.

In the configuration according to this embodiment, the first scan line driving circuit and the second scan line driving circuit are alternately driven for each predetermined frame at the first refresh rate. Therefore, at the first refresh rate, a voltage of the same potential is not continuously applied to switching elements in the scan line driving circuits, compared to a case where one of the first scan line driving circuit and the second scan line driving circuit is driven for a long period of time and the other is maintained in a stopped state. Consequently, a shift of threshold values of the switching elements are suppressed.

(2) In the display device according to (1), the control circuit is further configured to determine whether the refresh rate is the first refresh rate or the second refresh rate based on synchronization signal information about the video signal. Therefore, the control device can switch control for each refresh rate according to the video signal.

(3) In the display device according to (1) or (2), alternately driving either the first scan line driving circuit or the second scan line driving circuit includes supplying gate-on voltages to the scan line for a time longer than a time for which the first scan line driving circuit and the second scan line driving circuit supply the gate-on voltages to the scan lines at the second refresh rate when the refresh rate of the image displayed according to a video signal is the first refresh rate. Thus, although the gate-on voltages are applied only from one end of the scan line at the first refresh rate, the entire scan lines can be fully charged because the gate-on voltages are supplied for a long time. Therefore, the display device can perform high-quality display even in display at the first refresh rate.

(4) In the display device according to any one of (1) to (3), each of the first scan line driving circuit and the second scan line driving circuit includes switches disposed in supply paths of voltages to the scan lines, and alternately driving either the first scan line driving circuit or the second scan line driving circuit for each predetermined frame includes turning ON a switch in one of the first scan line driving circuit and the second scan line driving circuit and turning OFF a switch in the other of the first scan line driving circuit and the second scan line driving circuit for each predetermined frame.

Accordingly, in the first refresh rate, the first scan line driving circuit and the second scan line driving circuit alternately repeat a state of supplying the gate-on voltages to the scan lines and a state of not supplying the gate-on voltages to the scan lines for each predetermined frame. When the switch is turned OFF, supply of the gate-on voltages from the scan line driving circuit on the other side to the scan line is cut off, and the scan lines are in a high-impedance state. As a result, the display quality at the first refresh rate can be secured.

(5) A control method according to an embodiment is a control method of a liquid crystal display panel in which a plurality of scan lines are arranged side by side in a display region and which includes first and second scan line driving circuits that are disposed outside the display region and supply voltages to the plurality of scan lines. The first scan line driving circuit is connected to the plurality of scan lines at one end in an extending direction of the plurality of scan lines, and the second scan line driving circuit is connected to the plurality of scan lines at the other end of the plurality of scan lines in the extending direction of the plurality of scan lines. The control method includes alternately driving either the first scan line driving circuit or the second scan line driving circuit for each predetermined frame when a refresh rate of an image displayed according to a video signal is a first refresh rate, and driving both the first scan line driving circuit and the second scan line driving circuit at a second refresh rate higher than the first refresh rate. Consequently, in the display device, both an image quality at the high refresh rate and low power consumption are realized.

2. Examples of Display Device and Control Method

First Embodiment

FIG. 1 is a schematic cross-sectional view illustrating an example of a configuration of a display device 100 according to the present embodiment. The display device 100 includes a liquid crystal display panel 10 and a control device 50. The liquid crystal display panel 10 includes a thin film transistor (TFT) substrate 20 which is a glass substrate, a color filter (CF) substrate 30 which is a counter substrate, and a liquid crystal layer 40 between the TFT substrate 20 and the CF substrate 30. The control device 50 includes a signal line driving circuit (source driver) 60, a first scan line driving circuit (gate driver) 71 (refer to FIGS. 2 and 3), a second scan line driving circuit 72 (refer to FIGS. 2 and 3), and a display controller 80.

Figure 2:
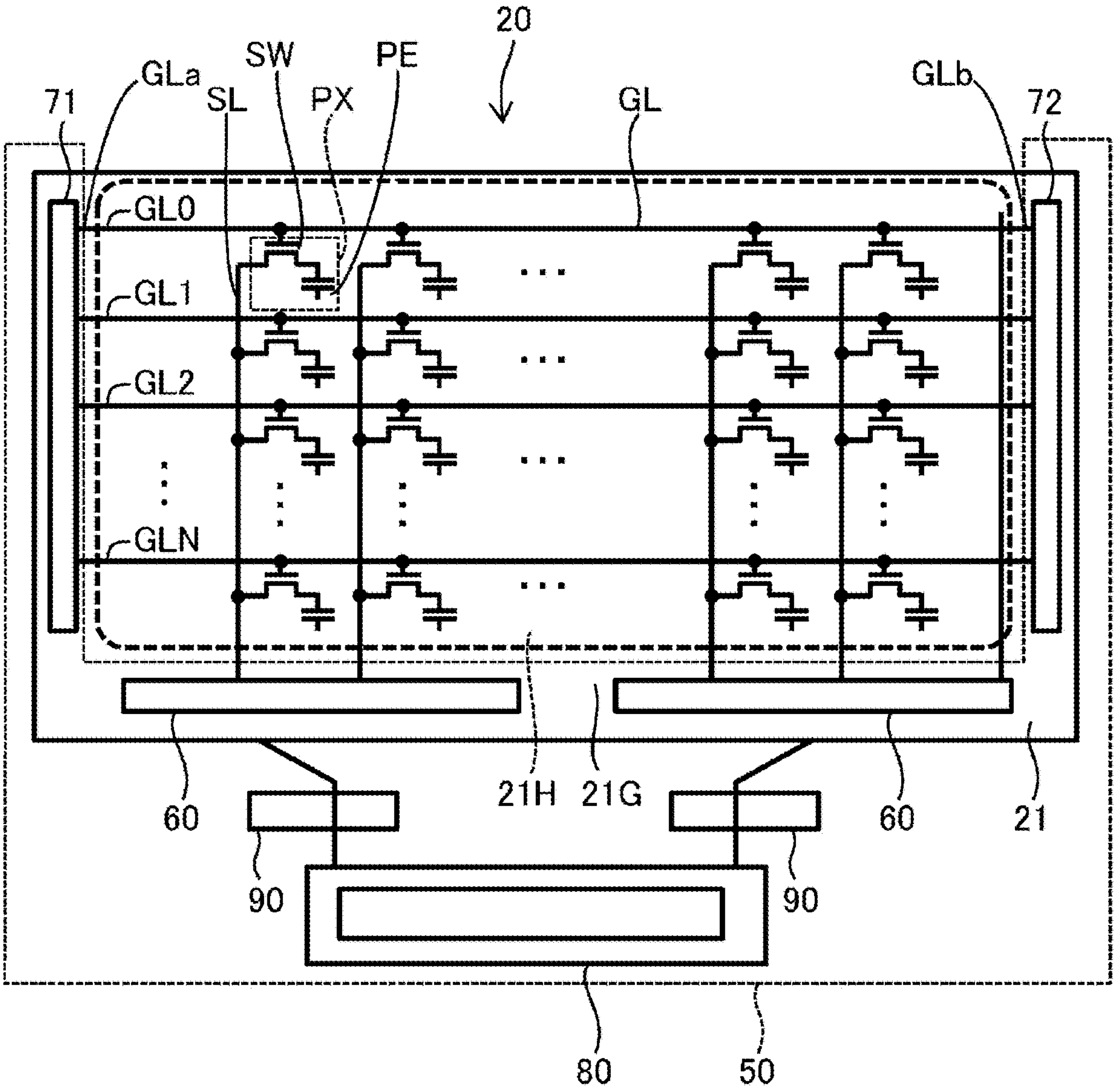
FIG. 2 is a schematic configuration diagram of a TFT substrate included in a liquid crystal display panel provided in the display device.

FIG. 2 is a schematic configuration diagram of the TFT substrate 20. The TFT substrate 20 includes a substrate 21 and a plurality of (for example, N+1) scan lines (gate bus lines) GL0, GL1, GL2, . . . , and GLN. The scan lines GL0, GL1, GL2, . . . , and GLN may be collectively referred to as a scan line GL. The TFT substrate 20 includes a plurality of signal lines (source bus lines) SL and a plurality of pixels PX. The substrate 21 includes a display region 21H and a non-display region (frame region) 21G which is a region other than the display region 21H. The non-display region 21G is disposed on the outer periphery of the display region 21H, and may be disposed around the display region 21H.

The plurality of scan lines GL, the plurality of signal lines SL, and the plurality of pixels PX are arranged in the display region 21H. Specifically, the plurality of scan lines GL extend in a first direction which is a row direction in FIG. 2, and the plurality of scan lines GL are arranged at predetermined intervals in a second direction which is a column direction in FIG. 2 and is orthogonal to the first direction. The plurality of scan lines GL are arranged in order of the scan lines GL0, GL1, GL2, . . . , and GLN from one end (for example, an upper end of FIG. 2) in the second direction.

The plurality of signal lines SL extend in the second direction and are arranged at predetermined intervals in the first direction. The pixels PX are arranged in a region surrounded by a pair of adjacent scan lines GL and a pair of adjacent signal lines SL. The plurality of pixels PX are arranged two dimensionally in the first direction and the second direction.

Each of the pixels PX includes a pixel electrode PE and a switching element SW. Each of the switching element SW is, for example, a three-terminal element, and the scan line GL, the signal line SL, and the pixel electrode PE are connected to each of the three terminals. The switching element SW is, for example, a TFT. A gate electrode of the TFT is connected to the scan line GL, a source electrode of the TFT is connected to the signal line SL, and a drain electrode of the TFT is connected to the pixel electrode PE. Each scan line GL is connected to the gate electrodes of the TFTs of the pixels PX arranged in the first direction out of the plurality of pixels PX. Each signal line SL is connected to the source electrodes of the TFTs of the pixels PX arranged in the second direction out of the plurality of pixels PX.

The signal line driving circuit 60, the first scan line driving circuit 71, and the second scan line driving circuit 72 are disposed in the non-display region 21G. The first scan line driving circuit 71 is disposed on one end GLa side of the scan line GL and is connected to the one end GLa, and the second scan line driving circuit 72 is disposed on the other end GLb side of the scan line GL and is connected to the other end GLb. The signal line driving circuit 60 is connected to the signal lines SL. As an example, signal line driving circuits 60 are disposed on left and right sides in the non-display region 21G, and are connected to the left-half signal lines SL and the right-half signal lines SL, respectively. The signal line driving circuit 60, the first scan line driving circuit 71, and the second scan line driving circuit 72 are connected to the display controller 80 via a flexible printed circuit (FPC) 90. As an example, the FPCs 90 are provided on each of the left and right sides, the left FPC connects the first scan line driving circuit 71 and the left signal line driving circuit 60 to the display controller 80, and the right FPC connects the second scan line driving circuit 72 and the right signal line driving circuit 60 to the display controller 80.

Figure 3:
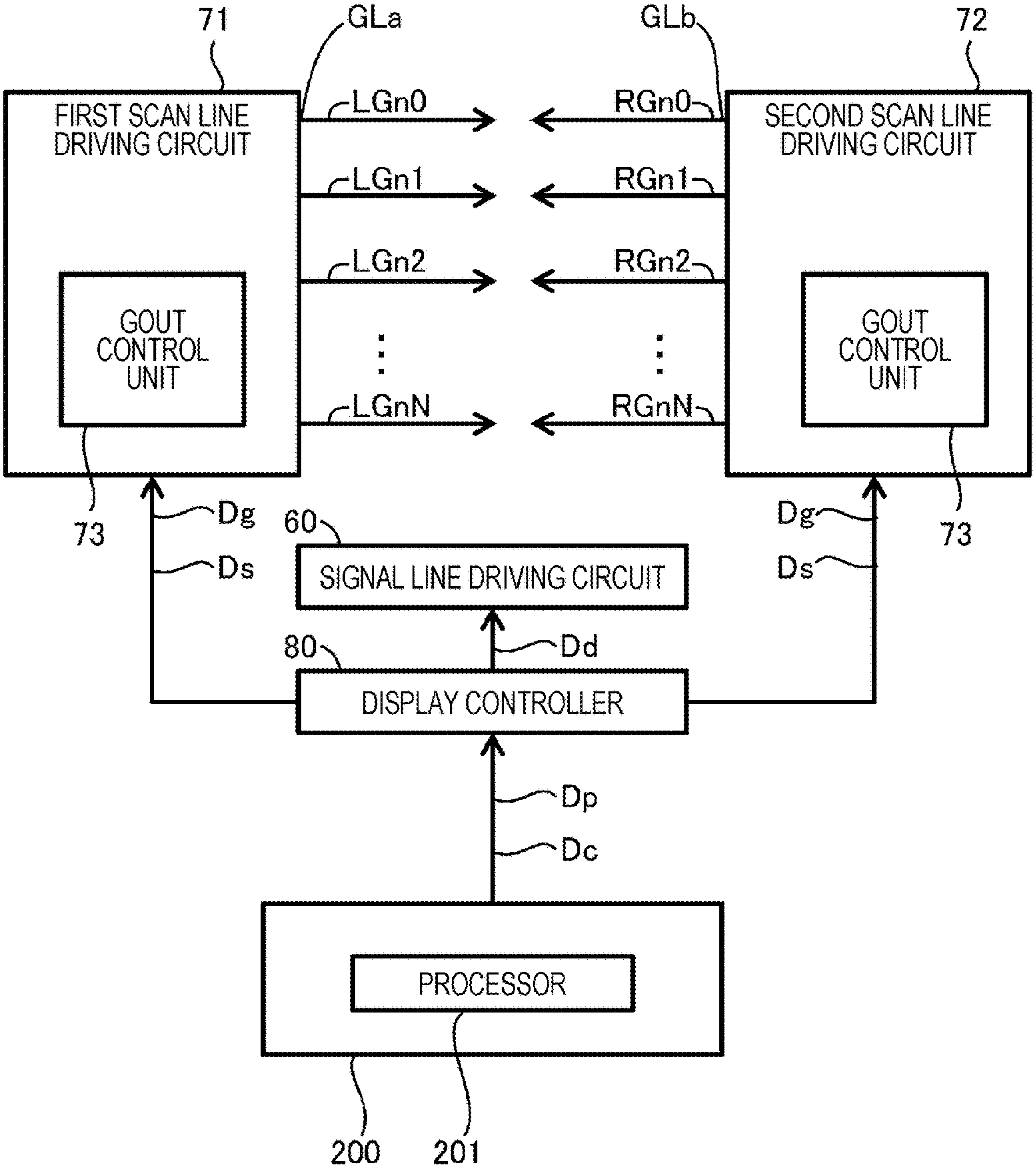
FIG. 3 is a schematic configuration diagram of a control device provided in the display device.

FIG. 3 is a schematic configuration diagram of the control device 50. The control device 50 receives a video signal Dp from a host device 200, and controls driving of the scan lines GL and the signal lines SL of the liquid crystal display panel 10. The host device 200 is a device on which the display device 100 is mounted, and includes, for example, one or more computers including a processor 201 such as a central processing unit (CPU).

The display controller 80 is a control circuit, and controls display on the liquid crystal display panel 10. The display controller 80 receives a control signal Dc and a video signal Dp from the host device 200. The control signal Dc includes synchronization signal information about the video signal Dp. The synchronization signal information includes basic clock frequency information, resolution information, vertical flyback interval information, and horizontal flyback interval information. The display controller 80 generates a frame signal Dg and a display data signal Dd from the video signal Dp. The frame signal Dg is a signal indicating a start point of each frame, and is a signal for matching timings at which the scan line driving circuits 71, 72 output a gate signal (a gate-on voltage GHi or a gate-off voltage GLo to be described later) to the scan lines GL.

The display device 100 can display images at a plurality of refresh rate levels. The plurality of refresh rate include a low refresh rate (first refresh rate) and a high refresh rate (second refresh rate value) higher than the first refresh rate. The combination of the first refresh rate and the second refresh rate is optional. As an example, the first refresh rate is 30 Hz and the second refresh rate is 60 Hz. As another example, the first refresh rate may be 60 Hz and the second refresh rate may be 120 Hz. As yet another example, the first refresh rate may be 30 Hz or 60 Hz and the second refresh rate may be 120 Hz. As a further example, the first refresh rate may be 30 Hz and the second refresh rate may be 60 Hz or 120 Hz. Each rate value described above is only an example, and may be any rate value.

The display controller 80 analyzes the basic clock frequency information, the resolution information, and the flyback interval information included in the control signal Dc, to determine the refresh rate in displaying an image according to the video signal Dp. The display controller 80 outputs a scan line switching signal Ds (hereinafter referred to as a GOUT control signal) according to the determination result of the refresh rate. The display controller 80 outputs a display data signal Dd to the signal line driving circuit 60 according to the determination result of the refresh rate. The display data signal Dd is supplied (written) to the pixel PX by the signal line driving circuit 60.

The display controller 80 outputs a frame signal Dg and a GOUT control signal Ds to the scan line driving circuits 71, 72. At this time, the display controller 80 varies the GOUT control signal Ds to be output to the scan line driving circuits 71, 72 according to the determination result of the refresh rate.

The GOUT control signal Ds is a signal for controlling driving of the first scan line driving circuit 71 and the second scan line driving circuit 72, and is, for example, an enable signal. The enable signal switches between a high level and a low level. When the determination result of the refresh rate is the high refresh rate, the display controller 80 outputs the high-level GOUT control signal Ds to both the scan line driving circuits 71, 72.

When the determination result of the refresh rate is the low refresh rate, the display controller 80 outputs the high-level GOUT control signal Ds to one of the scan line driving circuits 71, 72 and outputs the low-level GOUT control signal Ds to the other. One of the scan line driving circuits 71, 72 to which the high-level GOUT control signal Ds is applied supplies a scan line signal, which will be described later, to the scan line, and the other to which the low-level GOUT control signal Ds is applied stops. The display controller 80 repeats a state (first state) in which the high-level GOUT control signal Ds is output to the first scan line driving circuit 71 and the low-level GOUT control signal Ds is output to the second scan line driving circuit 72 at a predetermined timing, and a state (second state) in which the high-level GOUT control signal Ds is output to the second scan line driving circuit 72 and the low-level GOUT control signal Ds is output to the first scan line driving circuit 71. The predetermined timing, as an example, is indicated for each frame by the frame signal Dg generated from the video signal Dp.

Each of the scan line driving circuits 71, 72 receives a frame signal Dg from the display controller 80, and applies the scan line signals (gate signals) to the plurality of scan lines GL based on the frame signal Dg. Specifically, the first scan line driving circuit 71 applies scan line signals GL0, GL1, GL2, . . . , and GLN to the scan lines LGn0, LGn1, LGn2, . . . , and LGnN, respectively, from the one end GLa side. The second scan line driving circuit 72 applies scan line signals GL0, GL1, GL2, . . . , and GLN to the scan lines RGn0, RGn1, RGn2, . . . , and RGnN, respectively, from the other end GLb side.

The scan line signals are voltages applied to the scan lines GL, the scan line signals LGn0, LGn1, LGn2, . . . , and LGnN are voltages applied to the scan lines GL0, GL1, GL2, . . . , and GLN from one end GLa by the first scan line driving circuit 71, respectively, and the scan line signals RGn0, RGn1, . . . , and RGnN are voltages applied to the scan lines GL0, GL1, GL2, . . . , and GLN from the other end GLb by the second scan line driving circuit 72, respectively. The scan line signals LGn0, LGn1, LGn2, . . . , and LGnN are collectively referred to as a scan line signal LGn, and the scan line signals RGn0, RGn1, RGn2, . . . , and RGnN are collectively referred to as a scan line signal RGn. The scan line signal LGn and the scan line signal RGn are either the gate-on voltage GHi or the gate-off voltage GL0.

The scan line driving circuits 71, 72 receive the gate-on voltage GHi and the gate-off voltage GLo from a power circuit (not illustrated) and apply the gate-on voltage GHi and the gate-off voltage GLo to the scan line GL.

The TFTs (the switching elements SW of the pixels PX) are turned ON while the gate-on voltage GHi is applied from the scan line GL to the gate electrodes. The TFTs are in an off-state while a gate-off voltage GLo lower than the gate-on voltage GHi is applied. The on-state of the TFT indicates a state in which the display data signal Dd can be supplied to the pixel PX by the signal line driving circuit 60.

Applying the scan line signal to the scan line GL based on the frame signal Dg means that the scan line driving circuits 71, 72 sequentially apply the gate-on voltage GHi to the plurality of scan lines GL based on the frame signal Dg and apply the gate-off voltage GLo to the other scan line GL.

Thus, the display data signal Dd output based on the video signal Dp is sequentially written to the pixels PX by the signal line driving circuit 60.

Figure 4:
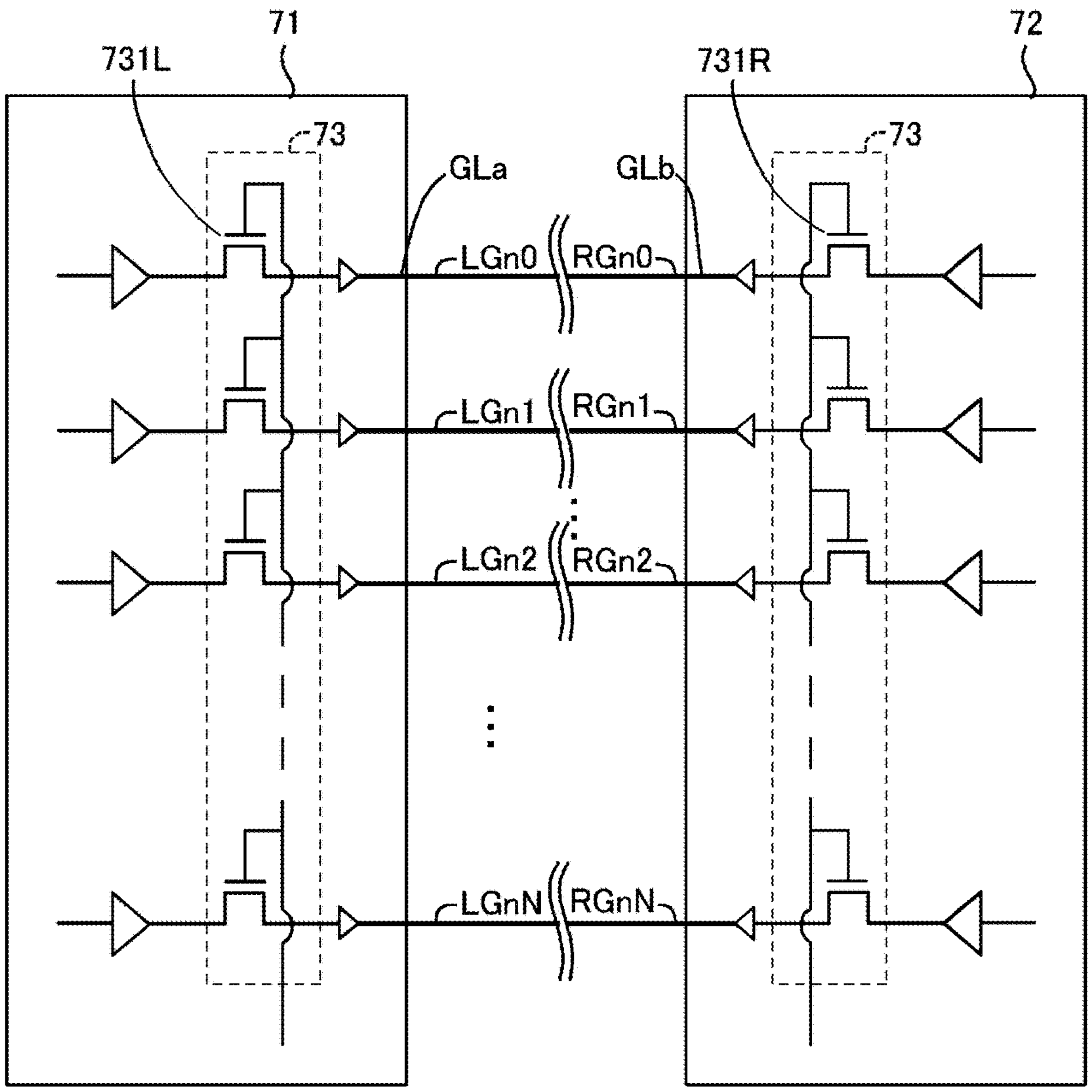
FIG. 4 is a schematic configuration diagram of a GOUT control unit included in a scan line driving circuit provided in the control device.

Each of the scan line driving circuits 71, 72 includes a GOUT control unit 73. FIG. 4 is a schematic configuration diagram of the GOUT control unit 73. The GOUT control unit 73 includes a switch 731L which is a TFT disposed in a connection path between the first scan line driving circuit 71 and each one end GLa of the plurality of scan lines GL, and a switch 731R which is a TFT disposed in a connection path between the second scan line driving circuit 72 and each other end GLb. The switches 731L and 731R are also collectively referred to as a switch 731.

The switch 731 is turned ON and OFF according to the GOUT control signal Ds from the display controller 80. That is, the switch 731 is turned ON when the GOUT control signal Ds is at a high level, and is turned OFF when the GOUT control signal Ds is at a low level. When the GOUT control signal Ds output to the first scan line driving circuit 71 is at a high level, the switch 731L is turned ON. When the GOUT control signal output to the second scan line driving circuit 72 is at a high level, the switch 731R is turned ON. Thus, applying the scan line signal in each of the scan line driving circuits 71, 72 is switched. When the switch 731 is turned ON, the scan line driving circuits 71, 72 are electrically connected to the plurality of scan lines GL. Therefore, the gate-on voltage GHi or the gate-off voltage GLo applied from the scan line driving circuits 71, 72 according to the frame signal Dg is supplied to each of the plurality of scan lines GL.

When the switch 731 is turned OFF, the scan line driving circuits 71, 72 and the plurality of scan lines GL are disconnected. Therefore, all of the plurality of scan lines GL are in the high impedance state (Hi-Z). The high impedance state of the scan lines GL means that the output from the scan line driving circuits 71, 72 is electrically open. At this time, the gate-on voltage GHi or the gate-off voltage GLo applied from the scan line driving circuits 71, 72 according to the frame signal Dg is not supplied to any of the plurality of scan lines GL. That is, the scan line driving circuits 71, 72 in which the switch 731 is turned OFF do not apply a voltage to any of the plurality of scan lines GL.

Specifically, in the first state, the gate-on voltage GHi or the gate-off voltage GLo applied by the first scan line driving circuit 71 based on the frame signal Dg is supplied to each of the plurality of scan lines GL from the one end GLa side. Since the second scan line driving circuit 72 is disconnected from the plurality of scan lines GL, a voltage is not applied to any of the scan lines from the other end GLb.

In the second state, the gate-on voltage GHi or the gate-off voltage GLo applied by the second scan line driving circuit 72 based on the frame signal Dg is supplied to each of the plurality of scan lines GL from the other end GLb side. Since the first scan line driving circuit 71 is disconnected from the plurality of scan lines GL, a voltage is not applied to any of the scan lines from the one end GLa side.

Figure 5:
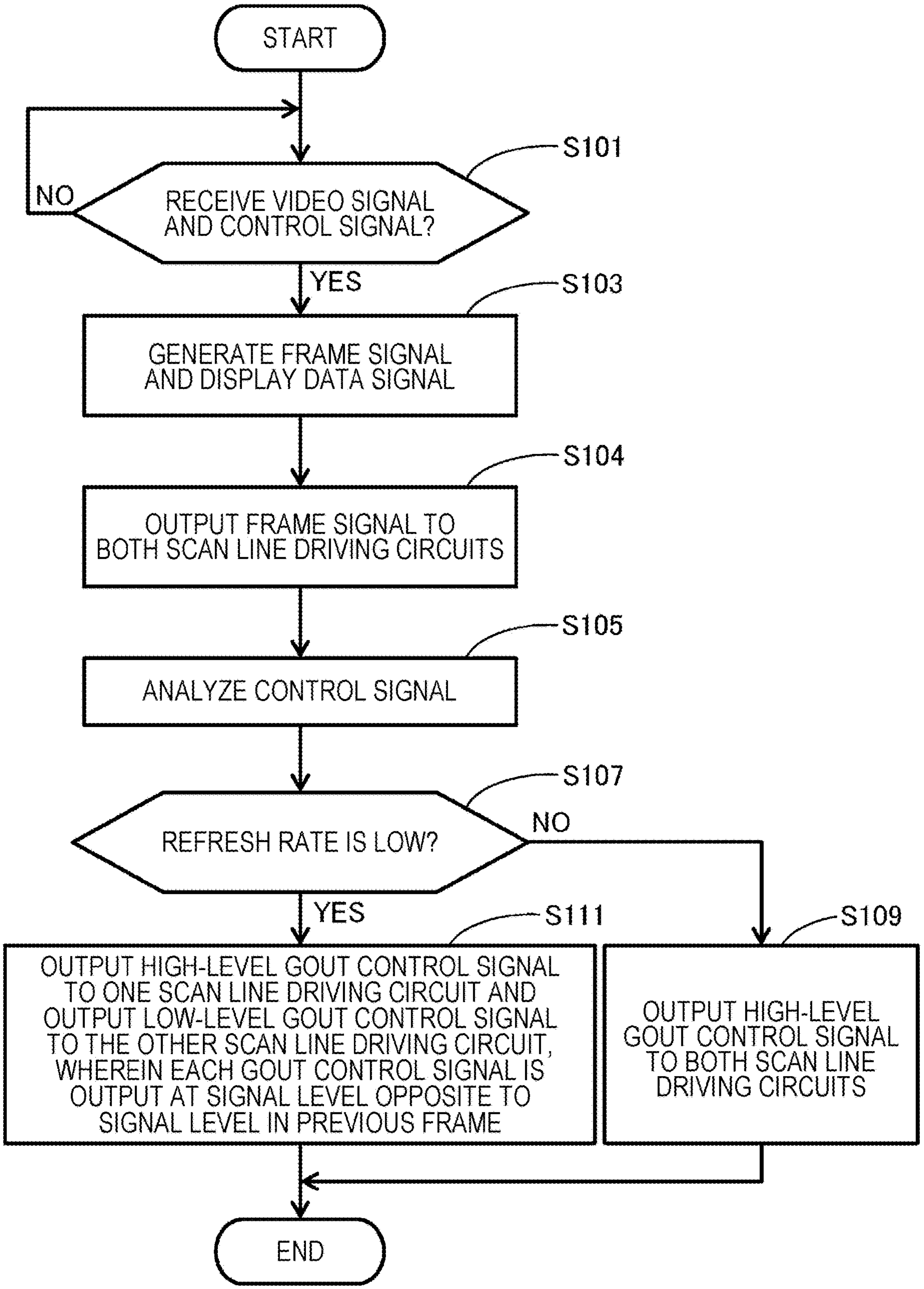
FIG. 5 is a flowchart illustrating an example of a flow of a method of controlling a liquid crystal display panel according to an embodiment.

FIG. 5 is a flowchart illustrating an example of a flow of a method of controlling the liquid crystal display panel 10 according to the present embodiment. When receiving the control signal Dc and the video signal Dp from the host device 200 (YES in step S101), the display controller 80 generates the frame signal Dg and the display data signal Dd from the video signal Dp (step S103). The display controller 80 outputs the generated frame signal Dg to both the first scan line driving circuit 71 and the second scan line driving circuit 72 (step S104).

The display controller 80 analyzes the control signal Dc to determine a refresh rate in displaying an image according to the video signal Dp (step S105). When the refresh rate is high (NO in step S107), the display controller 80 outputs a high-level GOUT control signal Ds to both the first scan line driving circuit 71 and the second scan line driving circuit 72 (step S109).

When the refresh rate is low (YES in step S107), the display controller 80 outputs the high-level GOUT control signal Ds to one of the scan line driving circuits, and outputs a low-level GOUT control signal Ds to the other of the scan line driving circuits (step S111). Specifically, in the step S111, the display controller 80 outputs the GOUT control signal Ds to each of the scan line driving circuits at a signal level opposite to the signal level of the GOUT control signal Ds output to each of the scan line driving circuits in a previous frame. Accordingly, in the low refresh rate, the GOUT control signal Ds is alternately output to the first scan line driving circuit 71 and the second scan line driving circuit 72 at the high signal level or the low signal level.

Figure 6:
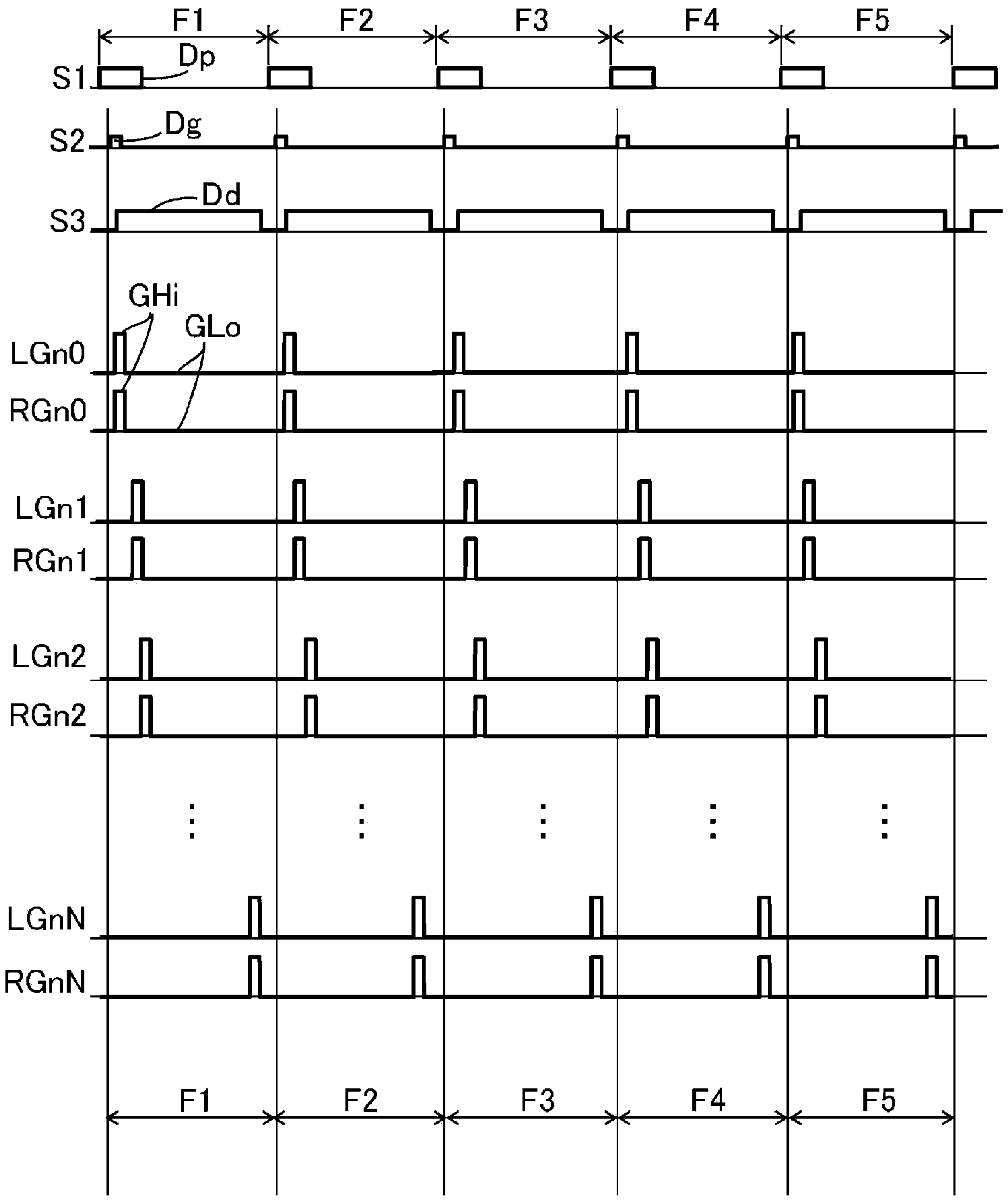
FIG. 6 is a schematic diagram illustrating timings at which scan line signals are supplied to a plurality of scan lines at a high refresh rate.
Figure 7:
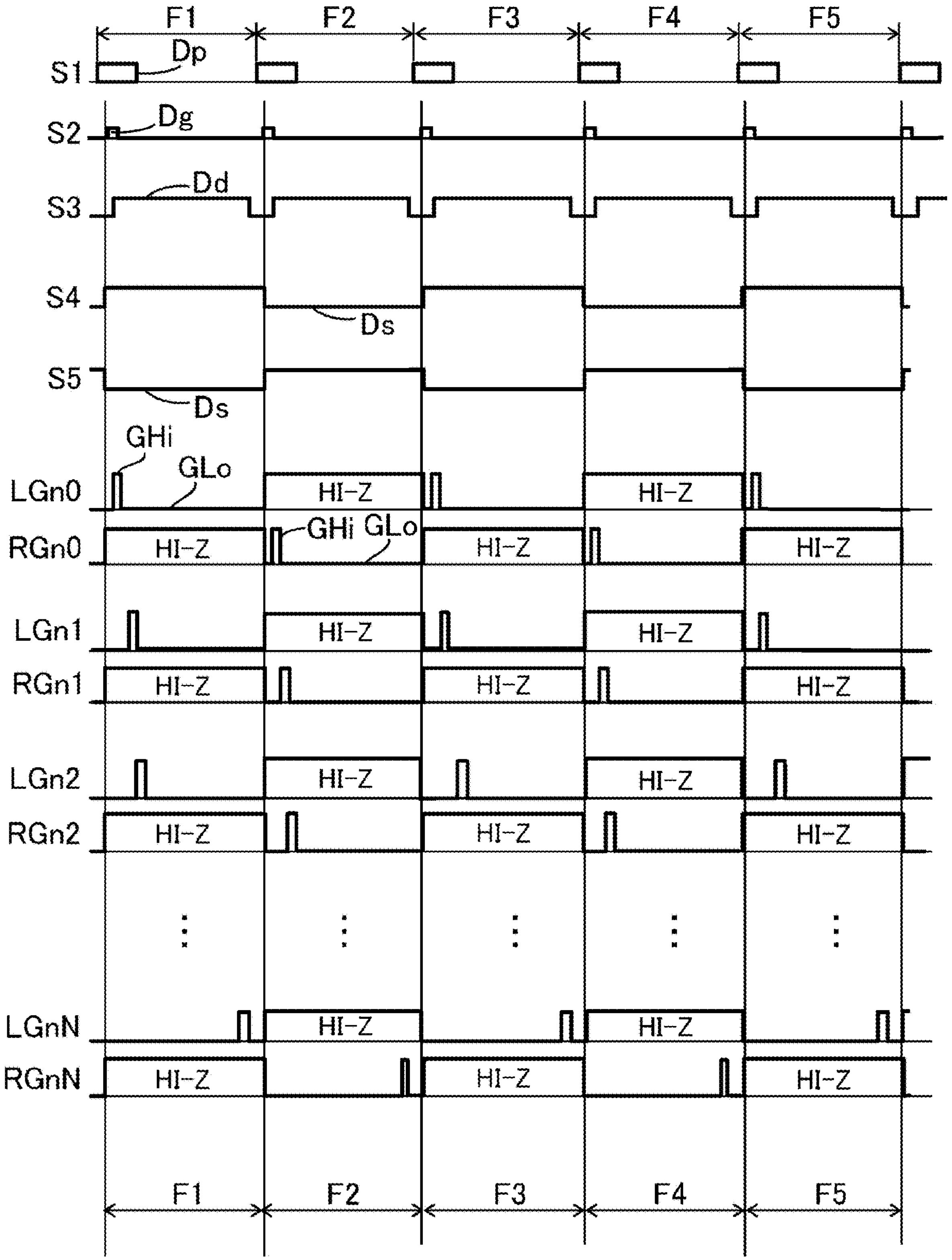
FIG. 7 is a schematic diagram illustrating timings at which scan line signals are supplied to a plurality of scan lines at a low refresh rate.

FIGS. 6 and 7 are schematic diagrams illustrating timings at which the scan line signal is supplied to the plurality of scan line lines GL. FIG. 6 is a schematic diagram illustrating the timing in the high refresh rate, and FIG. 7 is a schematic diagram illustrating the timing in the low refresh rate. In FIGS. 6 and 7, the horizontal direction indicates time. FIGS. 6 and 7 are timing charts illustrating a relation between signals S1 to S3 (and signals S4 and S5 in FIG. 7), scan line signals LGn0, LGn1, LGn2, . . . , and LGnN, and scan line signals RGn0, RGn1, RGn2, . . . , and RGnN.

A signal S1 indicates the video signal Dp from the host device 200. FIGS. 6 and 7 illustrate examples in which the control device 50 receives the video signal Dp from the host apparatus 200 for each frame from a frame F1 to a frame F5. In the high refresh rate (FIG. 6), one frame corresponds to, for example, 120 Hz. In the low refresh rate (FIG. 7), one frame corresponds to, for example, 30 Hz.

A signal S2 indicates the frame signal Dg generated from the video signal Dp. The frame signal Dg in each of the frames F1 to F5 indicates a start point of each frame.

A signal S3 is the display data signal Dd, and indicates a timing at which the display data signal Dd is supplied to the pixels PX by the signal line driving circuit 60. The display data signal Dd is supplied to the pixels PX by the signal line driving circuit 60 according to the frame signal Dg in each of the frames F1 to F5.

In the high refresh rate (FIG. 6), the gate-on voltage GHi is sequentially supplied from both the first scan line driving circuit 71 and the second scan line driving circuit 72 to the scan line GL in each frame. That is, in the high refresh rate, the gate-on voltage GHi is applied to the scan line GL from both ends by the scan line driving circuits 71, 72 for each frame.

Due to resistance components, parasitic capacitance components, or the like of the scan line GL, at a position far from an end of the scan line GL connected to the scan line driving circuit, a voltage waveform is disturbed and a signal is delayed. Therefore, the time during which the on-state of the TFT connected to the scan line GL is maintained may be shortened. However, since the gate-on voltage GHi is supplied from both ends of the scan line GL by each of the scan line driving circuits 71, 72 in the high refresh rate, a sufficient voltage is supplied to the entire scan line GL, and the gate-on voltage GHi is easily applied to each TFT. Thus, the display device 100 can manage the high refresh rate and display an image with high display quality.

In the low refresh rate (FIG. 7), signals S4 and S5 indicate the GOUT control signals Ds. The signal S4 indicates the GOUT control signal Ds output from the display controller 80 to the first scan line driving circuit 71. The signal S5 indicates the GOUT control signal Ds output from the display controller 80 to the second scan line driving circuit 72. In this example, a state in which the signal S4 is at a high level and the signal S5 is at a low level in the frame F1, a state in which the signal S4 is at a low level and the signal S5 is at a high level in the frame F2, a state in which the signal S4 is at a high level and the signal S5 is at a low level in the frame F3, . . . are alternately repeated.

In the low refresh rate, in the frame F1, the scan line signals RGn0, RGn1, RGn2, . . . , RGnN are not applied to any of the plurality of scan lines GL from the second scan line driving circuit 72 according to the low-level signal S5, and as a result, all of the plurality of scan lines GL are in a high impedance state (Hi-Z). On the other hand, the gate-on voltage GHi is sequentially supplied to the plurality of scan lines GL from the first scan line driving circuit 71 according to the high-level signal S4, and the gate-off voltage GLo is supplied at other timings.

In the frame F2, the scan line signals LGn0, LGn1, LGn2, . . . , LGnN are not applied to any of the plurality of scan lines GL from the first scan line driving circuit 71 according to the low-level signal S4, and as a result, the scan lines GL are in a high impedance state. On the other hand, the gate-on voltage GHi is sequentially supplied to the plurality of scan lines GL from the second scan line driving circuit 72 according to the high-level signal S5, and the gate-off voltage GLo is supplied at other timings.

In the frames F3 and F5, the same voltages are applied as in the frame F1, and in the frame F4, the same voltages are applied as in the frame F2. Therefore, in low refresh rate, either the first scan line driving circuit 71 or the second scan line driving circuit 72 is driven for each frame. As a result, in low refresh rate, since half of the scan line driving circuits stop driving, power of the stopped scan line driving circuits may be reduced. As a result, energy is saved as compared with the case where both are driven.

As a comparative example in which power is saved by stopping driving one of the scan line driving circuits, a control method of stopping driving only one of the first scan line driving circuit 71 and the second scan line driving circuit 72 and driving only the other may be considered. In the control method according to the comparative example, either an ON-voltage or an OFF-voltage is continuously applied to the switch 731 of the scan line driving circuit and the transistor constituting the scan line outputting circuit, which are not driven. Therefore, the shift of the threshold voltage of the switch 731 of the scan line driving circuit and the transistors constituting the scan line outputting circuit, which are not driven, becomes larger than the shift of the threshold voltage of the switch 731 of the scan line driving circuit and the transistors constituting the scan line outputting circuit, which are driven.

In contrast, in the control method according to the present embodiment, the voltage is alternately supplied to the scan line GL from either the first scan line driving circuit 71 or the second scan line driving circuit 72 in the low refresh rate. Accordingly, the voltage is alternately applied to each switch 731 of the first scan line driving circuit 71 and the second scan line driving circuit 72. As a result, the shift of the threshold voltage is suppressed.

In low refresh rate, when one scan line driving circuit supplies the gate-off voltage GLo from one end according to the GOUT control signal Ds, the gate-on voltage GHi is not sufficiently supplied to the entire scan line GL even when the other scan line driving circuit supplies the gate-on voltage GHi from the other end. In this regard, in the control method according to the present embodiment, the switches 731 of the scan line driving circuits 71, 72 are turned ON and OFF according to the GOUT control signal Ds, and thus the end of the scan line GL on the side to which the voltage is not supplied is electrically open. Therefore, in the control method according to this embodiment, the gate-on voltage GHi is sufficiently supplied to the entire scan line GL as compared with the control in which the gate-off voltage GLo is supplied from one end according to the GOUT control signal Ds in the low refresh rate. As a result, the display quality in the low refresh rate can be secured.

Second Embodiment

In the control method according to the second embodiment, the display controller 80 sets the time (application time) for supplying the gate-on voltage GHi to each of the first scan line driving circuit 71 and the second scan line driving circuit 72 in the low refresh rate to be longer than the application time of the gate-on voltage GHi in the high refresh rate. This is because the horizontal period can be set longer in the low refresh rate than in the high refresh rate.

As an example, the control method according to the second embodiment includes sending the control signal Dg1 for increasing the application time of the gate-on voltage GHi from the display controller 80 to each of the first scan line driving circuit 71 and the second scan line driving circuit 72. That is, as an example, the display controller 80 outputs the frame signal Dg in the high refresh rate, and outputs the frame signal Dg and the control signal Dg1 in the low refresh rate. The control signal Dg1 is a control signal for increasing the application time of the gate-on voltage GHi.

Figure 8:
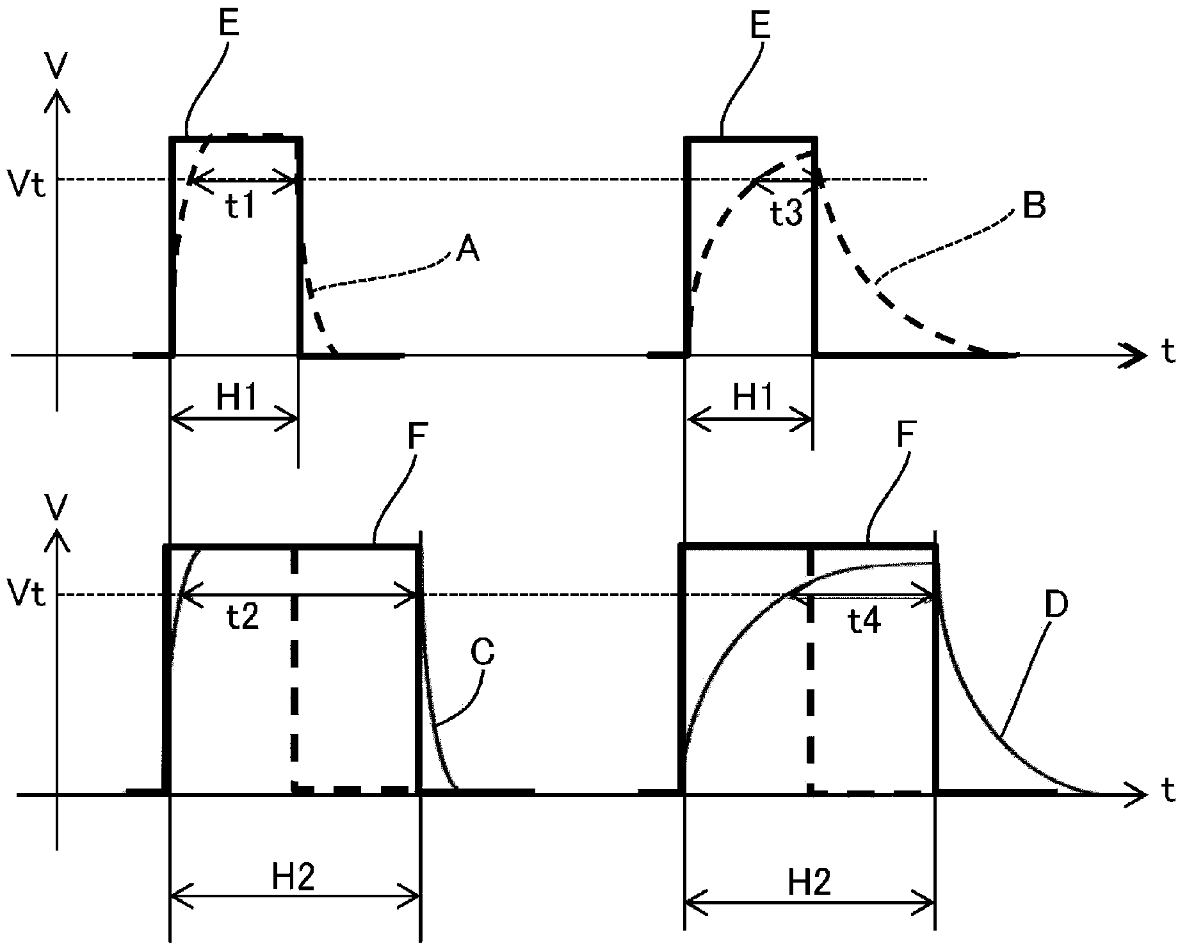
FIG. 8 is a diagram for describing a relation between the scan line signals from the first scan line driving circuit and voltages measured at one end and the other end of the scan line to which a gate-on voltage is applied, at the high refresh rate and at the low refresh rate, respectively, in a control method according to the second embodiment.

FIG. 8 is a diagram for describing a relation between the scan line signals LGn from the first scan line driving circuit 71 and voltages measured at one end GLa and the other end GLb of the scan line GL to which a gate-on voltage GHi is applied, at the high refresh rate and at the low refresh rate, respectively, in a control method according to the second embodiment. A waveform E schematically indicates a waveform of the scan line signal LGn in the high refresh rate, and a waveform F schematically indicates a waveform of the scan line signal LGn in the low refresh rate. A waveform A schematically indicates a voltage waveform measured at one end GLa of the scan line GL in the high refresh rate, a waveform B schematically indicates a voltage waveform measured at the other end GLb of the scan line GL in the high refresh rate, a waveform C schematically indicates a voltage waveform measured at one end GLa of the scan line GL in the low refresh rate, and a waveform D schematically indicates a voltage waveform measured at the other end GLb of the scan line GL in the low refresh rate. In FIG. 8, the horizontal axis indicates time (t) and the vertical axis indicates voltage (V).

The voltage Vt is a threshold voltage at which the TFT of the pixel PX is turned ON. When the gate-on voltage GHi is applied to the scan line GL and the voltage applied to the gate electrodes of the TFTs reaches the voltage Vt, the TFTs are turned ON. During a period in which the voltage applied to the gate electrodes exceeds the voltage Vt, the on-state of the TFTs is maintained. When the application of the gate-on voltage GHi to the scan line GL is finished and the voltage becomes lower than the voltage Vt, the TFTs shift to the off-state. A period during which the on-state of the TFT is maintained is also referred to as an on-time.

As illustrated in the comparison between the waveforms A and B and the comparison between the waveforms C and D, the pulse shape of the scan line signal LGn is maintained at a position close to the first scan line driving circuit 71, but the voltage applied to the gate electrodes of the TFTs does not sharply follow the rise of the scan line signal LGn at a position far from the first scan line driving circuit 71 due to the resistance components and parasitic capacitance components of the scan line GL, and as a result, it takes a long time to reach the threshold voltage Vt. Therefore, the on-time t3 of the waveform B at a position far from the first scan line driving circuit 71 is shorter than the on-time t1 of the waveform A at a position close to the first scan line driving circuit 71. Further, the on-time t4 of the waveform D at a position far from the first scan line driving circuit 71 is shorter than the on-time t2 of the waveform C at a position close to the first scan line driving circuit 71.

In the control method according to the second embodiment, the application time H1 of the gate-on voltage GHi in the low refresh rate is longer than the application time H2 of the gate-on voltage GHi in the high refresh rate (H1<H2).

At this time, as can be seen from the waveforms C and D, the on-time of the TFTs can be sufficiently secured even at a position far from the first scan line driving circuit 71 of the scan line GL. As a result, a sufficient pixel writing time can be secured even at a position far from the first scan line driving circuit 71, and as a result the good display quality can be secured.

Third Embodiment

The switching of driving between the first scan line driving circuit 71 and the second scan line driving circuit 72 in the low refresh rate is not limited to each frame. As another example, the switching may be every arbitrary frame. For example, the driving of the first scan line driving circuit 71 and the second scan line driving circuit 72 may be switched every two frames.

The display controller 80 according to the third embodiment includes, as an example, a counter (not illustrated) and counts the number of frame signals Dg. When the number of counted frame signals Dg reaches the number stored in advance as the number of switches between the first scan line driving circuit 71 and the second scan line driving circuit 72, the display controller 80 outputs the high-level GOUT control signal Ds to the scan line driving circuit on the side opposite to the scan line driving circuit that has output the high-level GOUT control signal Ds in the previous frame.

3. Appendix

The present disclosure is not limited to the above-described embodiment, and various modifications are possible.

The present disclosure contains subject matter related to that disclosed in Japanese Priority Patent Application JP 2023-161765 filed in the Japan Patent Office on Sep. 25, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a plurality of scan lines arranged side by side in a display region;

a first scan line driving circuit, that is disposed outside the display region, supplying a first voltage to the plurality of scan lines;

a second scan line driving circuit, that is disposed outside the display region, supplying a second voltage to the plurality of scan lines; and a control circuit configured to alternately drive either the first scan line driving circuit or the second scan line driving circuit in adjacent predetermined frames when a refresh rate of an image displayed according to a video signal is a first refresh rate, and to drive both the first scan line driving circuit and the second scan line driving circuit at a second refresh rate that is higher than the first refresh rate, wherein each of the plurality of scan lines is connected, in an extending direction of the plurality of scan lines, to the first scan line driving circuit at one end and is connected to the second scan line driving circuit at another end, and the control circuit is further configured to control the first scan line driving circuit and the second scan line driving circuit to output scan line signals to the plurality of scan lines from either the one end or the other end in adjacent predetermined frames when the refresh rate is the first refresh rate, and to output scan line signals to the plurality of scan lines from both the one end and the other end when the refresh rate is the second refresh rate.

2. The display device according to claim 1, wherein the control circuit is further configured to determine whether the refresh rate of the image is the first refresh rate or the second refresh rate based on synchronization signal information about the video signal.

3. The display device according to claim 1, wherein, a first time duration, during which the first scan line driving circuit and the second scan line driving circuit supply gate-on voltages to the plurality of scan lines when the refresh rate of the image is the first refresh rate, is longer than a second time duration, during which the first scan line driving circuit and the second scan line driving circuit supply the gate-on voltages to the plurality of scan lines when the refresh rate of the image is the second refresh rate.

4. The display device according to claim 1, wherein each of the first scan line driving circuit and the second scan line driving circuit includes switches disposed in supply paths of voltages supplied to the plurality of scan lines, and alternately driving either the first scan line driving circuit or the second scan line driving circuit in the adjacent predetermined frames includes turning ON a switch in one of the first scan line driving circuit and the second scan line driving circuit, while turning OFF a switch in another one of the first scan line driving circuit and the second scan line driving circuit for each predetermined frame.

5. A control method performed by a liquid crystal display panel in which a plurality of scan lines is arranged side by side in a display region and the liquid crystal display panel includes first and second scan line driving circuits that are disposed outside the display region and that supply voltages to the plurality of scan lines, the control method comprising:

alternately driving either the first scan line driving circuit or the second scan line driving circuit in adjacent predetermined frames when a refresh rate of an image displayed according to a video signal is a first refresh rate; and driving both the first scan line driving circuit and the second scan line driving circuit at a second refresh rate that is higher than the first refresh rate, wherein each of the plurality of scan lines is connected, in an extending direction of the plurality of scan lines, to the first scan line driving circuit at one end and is connected to the second scan line driving circuit at another end, and the control method further comprises controlling the first scan line driving circuit and the second scan line driving circuit to output scan line signals to the plurality of scan lines from either the one end or the other end in adjacent predetermined frames when the refresh rate is the first refresh rate, and to output scan line signals to the plurality of scan lines from both the one end and the other end when the refresh rate is the second refresh rate.

* * * * *